United States Patent
Ootani

(10) Patent No.: US 12,090,657 B2
(45) Date of Patent: Sep. 17, 2024

(54) PARALLEL LINK ROBOT

(71) Applicant: FANUC CORPORATION, Yamanashi (JP)

(72) Inventor: Kentarou Ootani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/546,562

(22) PCT Filed: Apr. 30, 2021

(86) PCT No.: PCT/JP2021/017253
§ 371 (c)(1),
(2) Date: Aug. 15, 2023

(87) PCT Pub. No.: WO2022/230194
PCT Pub. Date: Nov. 3, 2022

(65) Prior Publication Data
US 2024/0131691 A1  Apr. 25, 2024
US 2024/0227170 A9  Jul. 11, 2024

(51) Int. Cl.
B25J 9/10     (2006.01)

(52) U.S. Cl.
CPC .................. B25J 9/1065 (2013.01)

(58) Field of Classification Search
None
See application file for complete search history.

(56) References Cited

U.S. PATENT DOCUMENTS

| 6,976,922 | B2  |  12/2005 | Smith |
| 10,166,684 | B2 * | 1/2019 | Brogardh ............. B25J 17/0266 |
| 10,919,147 | B2 * | 2/2021 | Matsushita ............ B25J 9/1623 |
| 10,960,534 | B2 * | 3/2021 | Yamamoto ............... B25J 18/00 |

(Continued)

FOREIGN PATENT DOCUMENTS

| JP | H11104156 A | 4/1999 |
| JP | 2005201433 A | 7/2005 |

(Continued)

OTHER PUBLICATIONS

International Search Report and Written Opinion issued for priority International Application No. PCT/JP2021/017253, mailed Jul. 6, 2021 (translation of Search Report only).

*Primary Examiner* — Vicky A Johnson
(74) *Attorney, Agent, or Firm* — Renner, Otto, Boisselle & Sklar, LLP

(57) ABSTRACT

A robot includes: a drive link; two parallel passive links coupled to the drive link; and a support mechanism having two shafts. Each shaft is fixed to each of the passive links so that each shaft is engaged with a through-hole at an intermediate position of each of the passive links along a longitudinal axis thereof, and an auxiliary link rotatably attached to the shafts by bearings in which the shafts engage. The through-hole is formed in a direction that is orthogonal to a plane including the longitudinal axis. Each shaft includes a first shaft section engaged with the through-hole and abutting on one end surface, a second shaft section engaged with the through-hole and abutting on another end surface, and a fastening section applying a force in a direction that causes the first shaft section and the second shaft section to approach each other within the through-hole.

6 Claims, 10 Drawing Sheets

(56) References Cited

U.S. PATENT DOCUMENTS

| 11,224,979 B2 * | 1/2022 | Ta ........................ B25J 17/0275 |
| 2008/0108446 A1 | 5/2008 | Faude |
| 2021/0245363 A1 | 8/2021 | Füssl et al. |

FOREIGN PATENT DOCUMENTS

| JP | 2008142169 A | 6/2008 |
| JP | 2011088262 A | 5/2011 |
| JP | 2011093075 A | 5/2011 |
| JP | 2014111291 A | 6/2014 |
| JP | 2017074630 A | 4/2017 |
| JP | 2020078839 A | 5/2020 |
| WO | 2020049152 A1 | 3/2020 |
| WO | 2022210243 A1 | 10/2022 |

* cited by examiner

PARALLEL LINK ROBOT

This application is a national phase of International Application No. PCT/JP2021/017253, filed Apr. 30, 2021, which is hereby incorporated herein by reference in its entirety.

TECHNICAL FIELD

The present disclosure relates to parallel link robots.

BACKGROUND ART

A known so-called delta-type parallel link robot in the related art includes three drive links rotationally driven by three motors and three pairs of parallel passive links coupled to the respective drive links and a movable section (for example, see Patent Literature 1). This parallel link robot also includes an additional actuator disposed between the passive links of each pair and parallel to the passive links. Each additional actuator is rotatably supported by an auxiliary link by using bearings. The auxiliary link is suspended between the passive links of each pair and is rotatably attached to the passive links by using the bearings.

CITATION LIST

Patent Literature

{PTL 1}
Japanese Unexamined Patent Application Publication No. 2020-78839

SUMMARY OF INVENTION

An aspect of the present disclosure provides a parallel link robot including: a drive link rotationally driven by an actuator; two parallel rod-shaped passive links coupled to a leading end of the drive link; and a support mechanism having two shafts and an auxiliary link. Each of the shafts is fixed to each of the passive links in a state where each of the shafts is engaged with a through-hole provided at an intermediate position of each of the passive links in a direction of a longitudinal axis thereof. The auxiliary link is rotatably attached to the shafts by two bearings in which the shafts engage with inner rings thereof. The through-hole is formed in a first direction that is orthogonal to a plane including the longitudinal axis of each of the two passive links. Each of the shafts includes a first shaft section, a second shaft section, and a fastening section. The first shaft section is engaged with the through-hole from one end surface in the first direction and abutting on the one end surface. The second shaft section is engaged with the through-hole from the other end surface in the first direction and abutting on the other end surface. The fastening section applies a force in a direction that causes the first shaft section and the second shaft section to approach each other within the through-hole.

DESCRIPTION OF EMBODIMENTS

A parallel link robot 1 according to an embodiment of the present disclosure will be described below with reference to the drawings.

Figure 1:
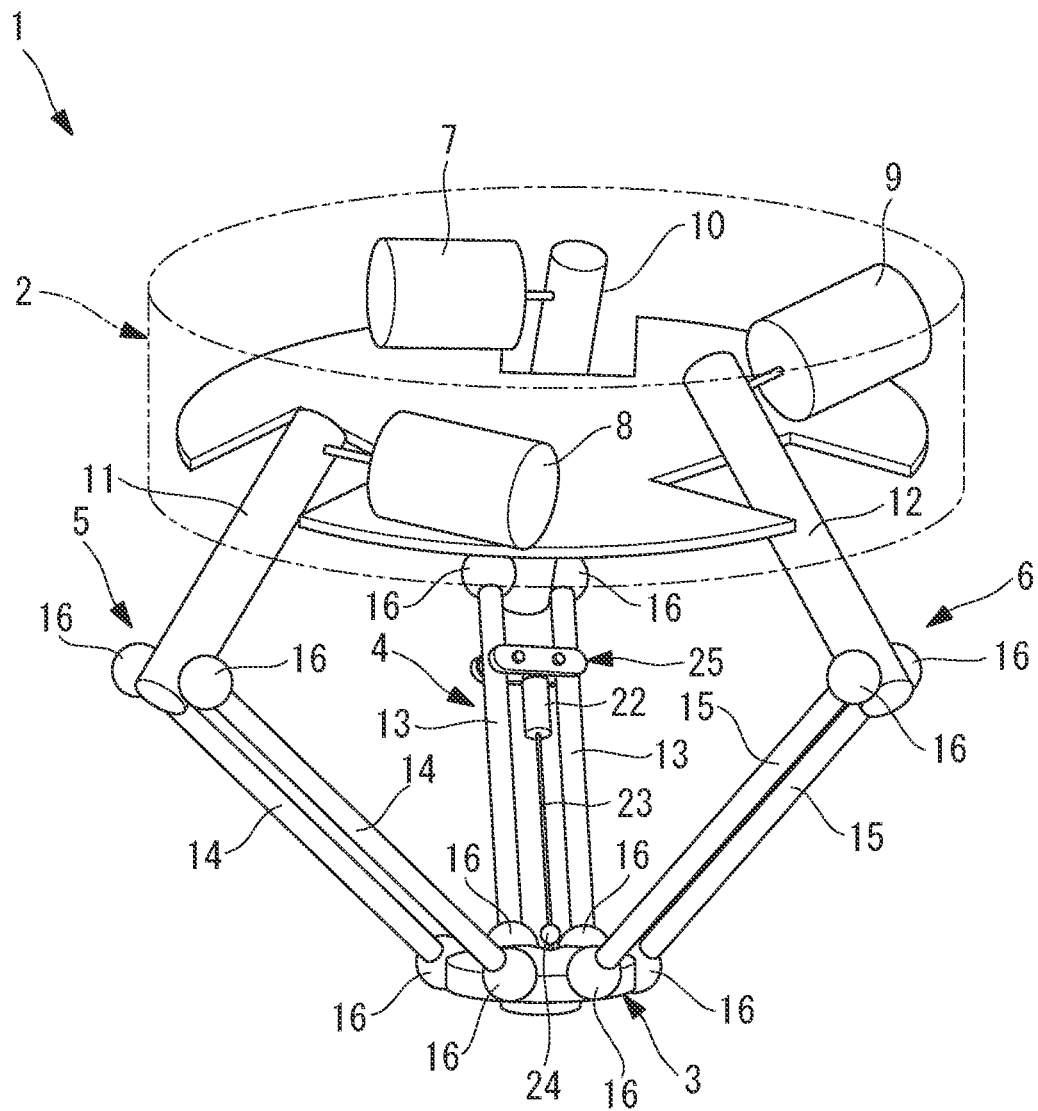
FIG. 1 is a perspective view illustrating a parallel link robot according to an embodiment of the present disclosure.

As shown in FIG. 1, the parallel link robot 1 according to this embodiment includes a base section 2 fixed to an external structure, such as a ceiling or a pedestal, a movable section 3 disposed below the base section 2, and three arms 4, 5, and 6 that couple the base section 2 and the movable section 3 parallel to each other.

The base section 2 includes three actuators (e.g., servomotors and reducers) 7, 8, and 9 for driving the three arms 4, 5, and 6, respectively.

The arms 4, 5, and 6 respectively include drive links 10, 11, and 12 rotationally driven by the actuators 7, 8, and 9, and pairs of parallel rod-shaped passive links 13, 14, and 15 that couple the drive links 10, 11, and 12 to the movable section 3. The passive links 13, 14, and 15 are rotatably coupled to the drive links 10, 11, and 12 and the movable section 3 by using spherical bearings 16.

Figure 2:
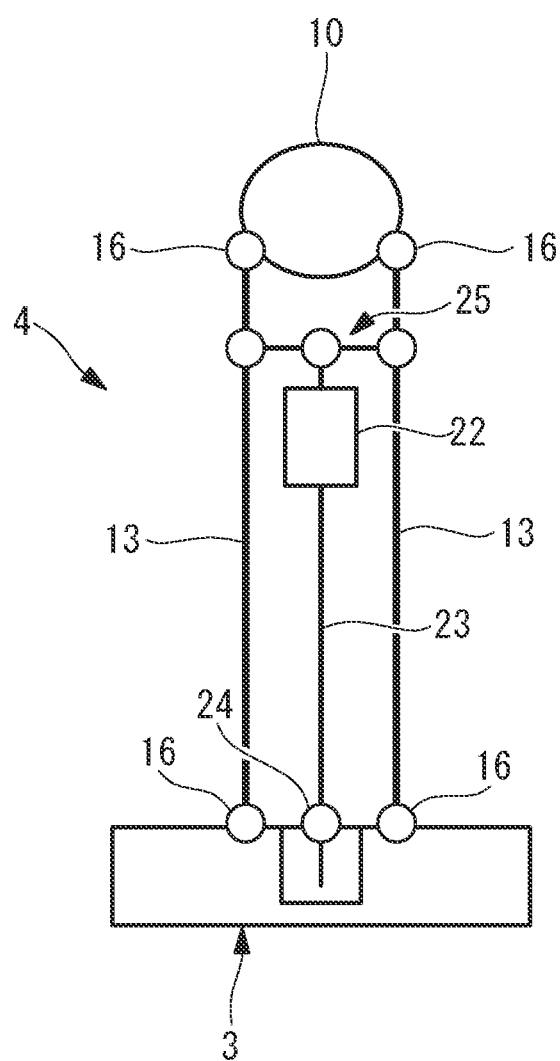
FIG. 2 schematically illustrates the relationship among passive links, an additional actuator, and a movable section of the parallel link robot in FIG. 1.
Figure 3:
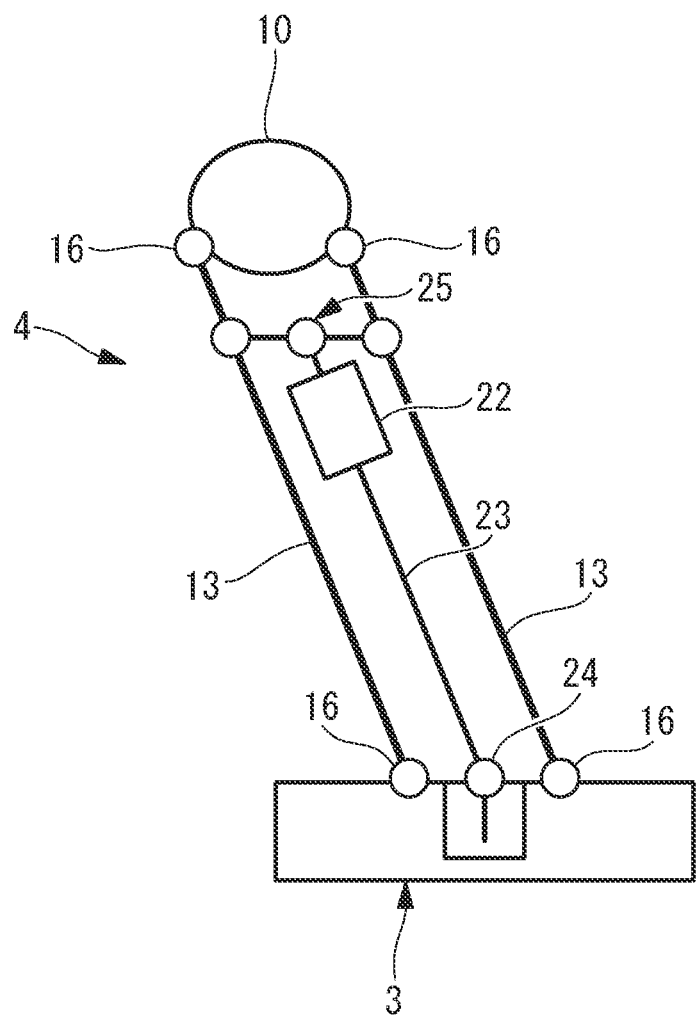
FIG. 3 schematically illustrates the operation of the passive links, the additional actuator, and the movable section in FIG. 2.

As shown in FIG. 2 and FIG. 3, the four spherical bearings 16 disposed at the opposite ends of the two passive links 13, 14, or 15 of the arm 4, 5, or 6 are disposed at positions where a rectangle with its corners defined by the centers of the spherical bearings 16 form a parallelogram.

Figure 4:
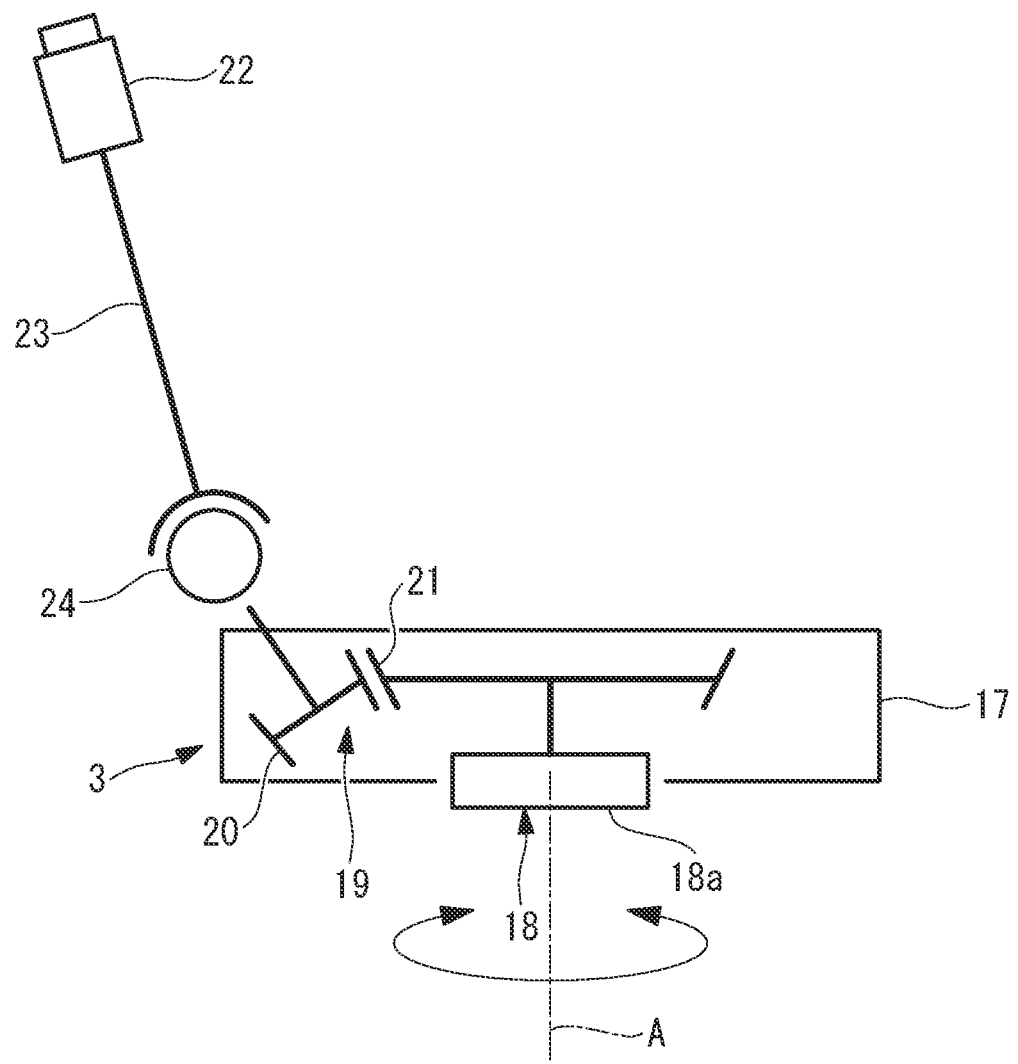
FIG. 4 schematically illustrates the structure for transmitting a driving force from the additional actuator to a wrist shaft of the parallel link robot in FIG. 1.

As shown in FIG. 4, for example, the movable section 3 includes a disk-shaped casing 17 disposed with its central axis A oriented in the vertical direction, a wrist shaft member 18 supported by the casing 17 in such a manner as to be rotatable around the central axis A, and a driving-force transmission mechanism 19. The wrist shaft member 18 has a lower end provided with an attachment surface 18a to which a tool, such as a hand, is attachable. The driving-force transmission mechanism 19 includes a first gear 20 rotatably supported by the casing 17 and a second gear 21 that is fixed to the wrist shaft member 18 and that meshes with the first gear 20.

As shown in FIG. 1, the three arms 4, 5, and 6 are disposed at an equal pitch in the circumferential direction around the central axis of the base section 2. The three actuators 7, 8, and 9 are controlled in a synchronous fashion so that the movable section 3 can be positioned by being translationally moved to a desired position in three-dimensional directions, including two horizontal directions and one vertical direction, while the central axis A of the movable section 3 is maintained in the vertical direction.

Figure 5:
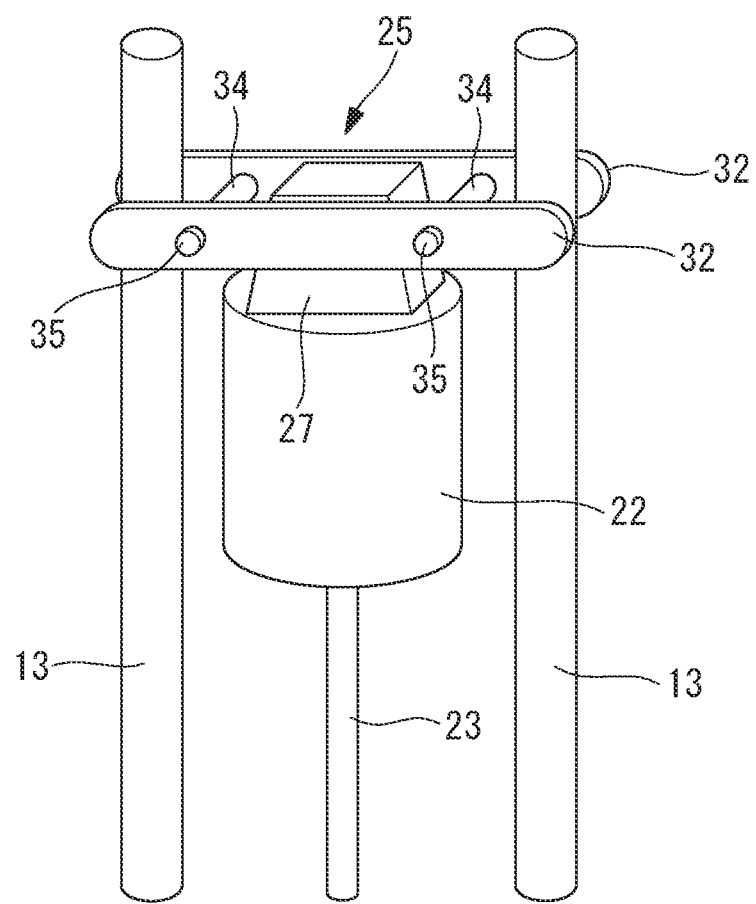
FIG. 5 is a partial perspective view illustrating a support mechanism for the additional actuator of the parallel link robot in FIG. 1.

As shown in FIG. 1 and FIG. 5, the parallel link robot 1 includes an additional actuator 22 set between the passive links 13 of the single arm 4. The additional actuator 22 (e.g., a servomotor and a reducer) is provided for rotationally driving the wrist shaft member 18 of the movable section 3. An output shaft (not shown) of the additional actuator 22 and the first gear 20 of the driving-force transmission mechanism 19 are coupled to each other by a drive shaft 23 that transmits a driving force generated by the additional actuator 22 to the first gear 20.

The drive shaft 23 extends parallel to the passive links 13 in the vicinity of the center between the two passive links 13 in the direction in which they are separated from each other, and is coupled to the first gear 20 of the driving-force transmission mechanism 19 by using a universal joint 24. The center point of the universal joint 24 is preferably disposed on a line connecting the center points of the two spherical bearings 16 that couple the two passive links 13 to the movable section 3.

The additional actuator 22 is supported by the two passive links 13 by using a support mechanism 25.

Figure 6:
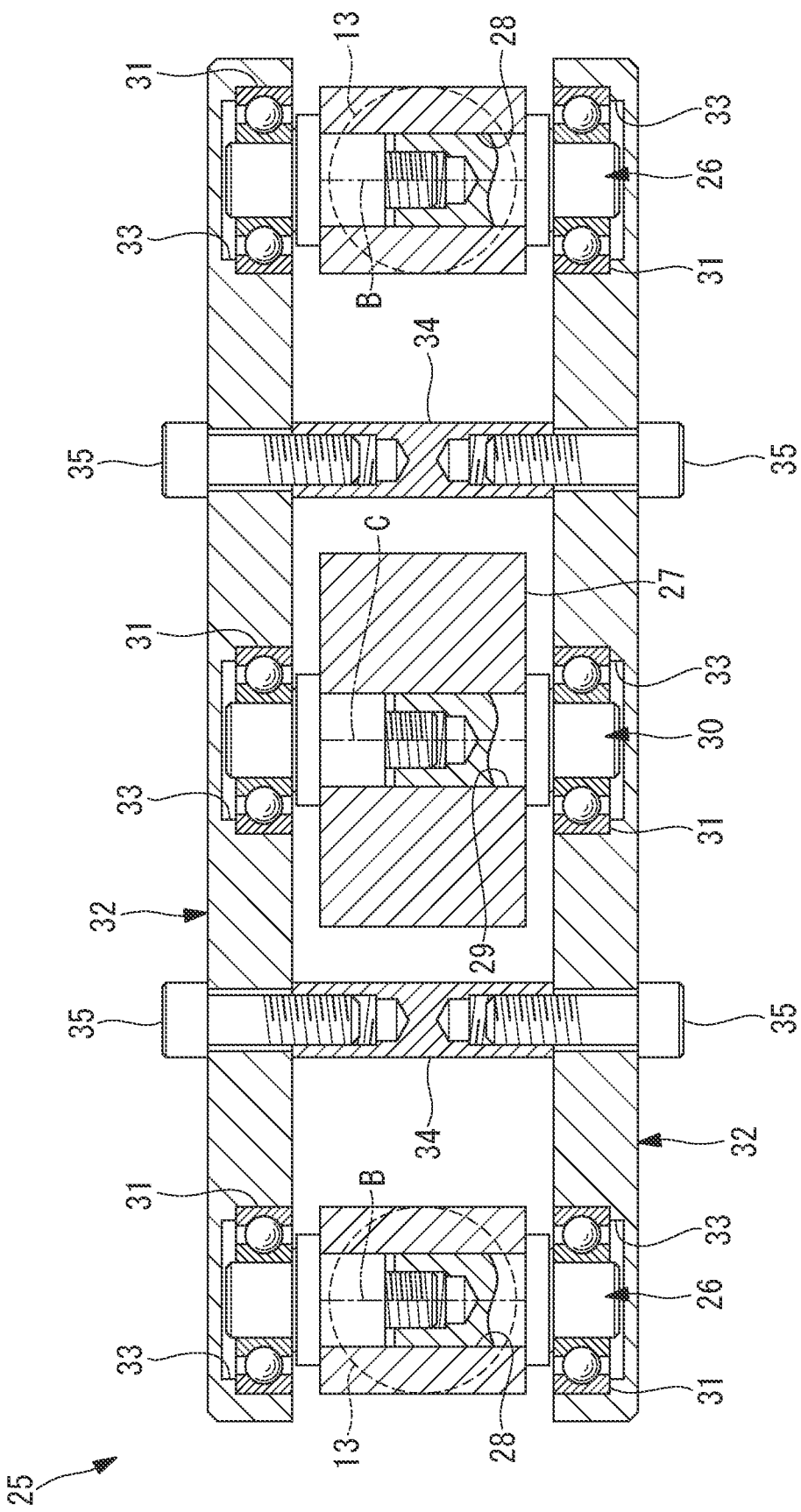
FIG. 6 is a vertical sectional view illustrating the support mechanism in FIG. 5.

As shown in FIG. 6, the support mechanism 25 includes two parallel shafts 26 fixed to the passive links 13 in a state where the shafts 26 pass through through-holes 28 provided at an intermediate position in the longitudinal direction of the two passive links 13. The through-holes 28 extend in a direction orthogonal to a plane that includes the longitudinal axes of the two passive links 13. This direction will be referred to as a first direction hereinafter. The support mechanism 25 also includes a single shaft (i.e., another shaft) 30 fixed to an attachment section 27 in a state where the shaft 30 passes through a through-hole (i.e., another through-hole) 29 that is provided in the attachment section 27, which is tabular, at one end of the additional actuator 22 and that extends in a direction parallel to the first direction.

Central axes B and C of the three shafts 26 and 30 are preferably disposed within the same plane that is parallel to a line connecting the centers of the two spherical bearings 16 that couple the two passive links 13 to the drive link 10.

Moreover, the support mechanism 25 includes six rolling bearings (i.e., bearings, other bearings) 31 in which opposite ends of the three shafts 26 and 30 engage with inner rings thereof, and a pair of auxiliary links 32 to which outer rings of three of the rolling bearings 31 are fixed.

Each auxiliary link 32 is provided with three recesses 33 respectively engageable with the outer rings of the three rolling bearings 31. For example, the inner peripheral surface of each recess 33 and the outer peripheral surface of the outer ring of the corresponding rolling bearing 31 are fixed to each other by press-fitting or by using an adhesive. Accordingly, the two auxiliary links 32 are coupled to the two passive links 13 in such a manner as to be rotatable around the central axes B of the shafts 26 at the opposite sides of the two passive links 13 in the first direction. Furthermore, the two auxiliary links 32 support the additional actuator 22 in a rotatable manner around the central axis (axis) C of the shaft 30 at the opposite sides of the attachment section 27 of the additional actuator 22 in the first direction.

In FIG. 6, each reference sign 34 denotes a spacer adjusted to an appropriate length for applying a pre-load to the rolling bearings 31, and each reference sign 35 denotes a bolt for attaching the corresponding spacer 34 between the two auxiliary links 32.

Figure 7:
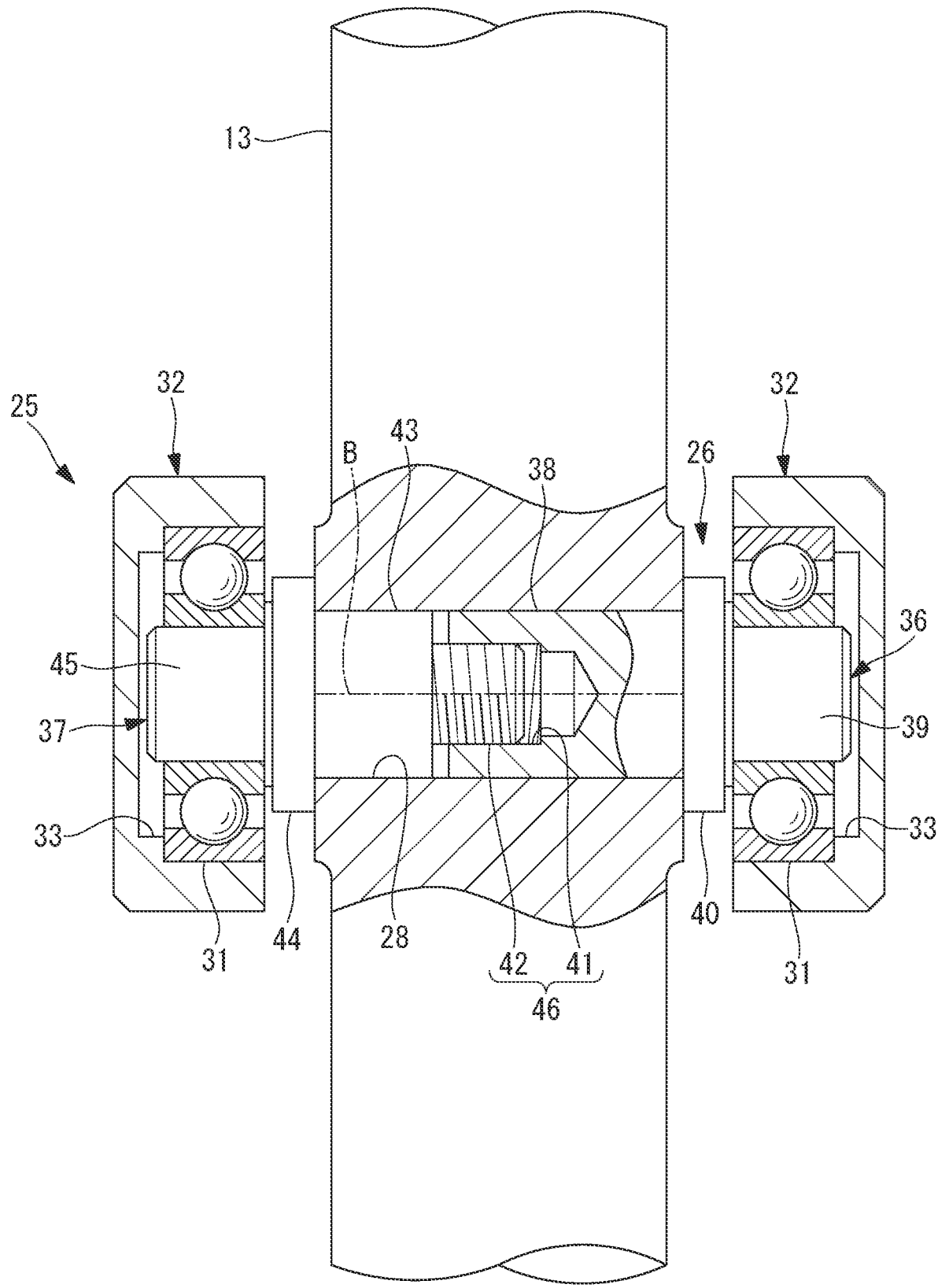
FIG. 7 is a partial vertical sectional view illustrating a shaft of the support mechanism in FIG. 6.
Figure 8:
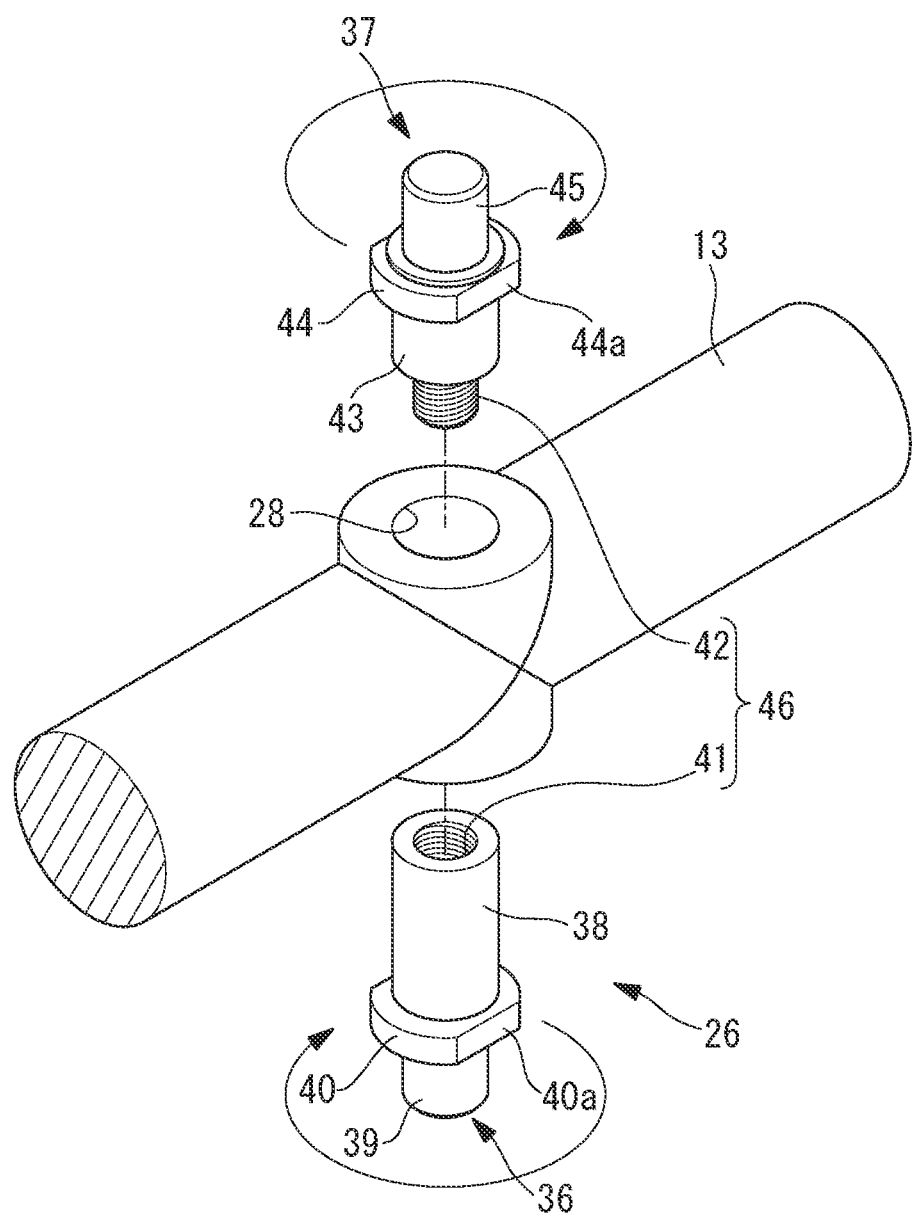
FIG. 8 is a partially exploded perspective view illustrating the shaft of the support mechanism in FIG. 7.
Figure 9:
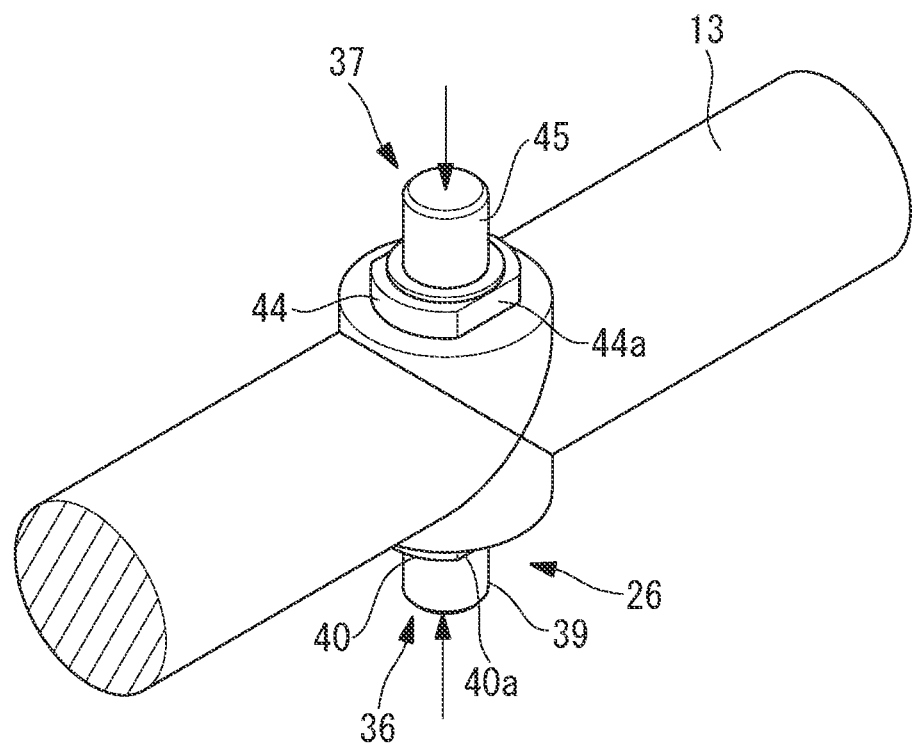
FIG. 9 is a partial perspective view illustrating a state where the shaft in FIG. 8 is fixed to one of the passive links.

In this embodiment, as shown in FIG. 7 to FIG. 9, the two shafts 26 fixed to the passive links 13 each include a first shaft section 36 and a second shaft section 37. The first shaft section 36 includes a first engagement section 38 provided at one axial end and engageable with the corresponding through-hole 28, a second engagement section 39 provided at the other axial end and engageable with the inner ring of the corresponding rolling bearing 31, and a flange section 40 disposed at an intermediate position in the axial direction and protruding radially outward relative to the first engagement section 38.

The one axial end provided with the first engagement section 38 has a center hole centered on the corresponding central axis B, and the inner peripheral surface of the center hole is provided with a female thread 41. The outer peripheral surface of the flange section 40 is provided with at least one pair of parallel flat sections 40a located at opposite sides with the central axis B interposed therebetween and engageable with a tool, such as a spanner.

The second shaft section 37 includes, in the following order from one axial end, a male thread 42 fastenable to the female thread 41 of the first shaft section 36, a first engagement section 43 engageable with the through-hole 28, a flange section 44 protruding radially outward relative to the first engagement section 43, and a second engagement section 45 engageable with the inner ring of the corresponding rolling bearing 31. The female thread 41 of the first shaft section 36 and the male thread 42 of the second shaft section 37 constitute a fastening section 46. The flange section 44 of the second shaft section 37 is also provided with flat sections 44a for a tool.

As shown in FIG. 8, the two shafts 26 are fixed to each passive link 13 by fastening the male thread 42 of the second shaft section 37 to the female thread 41 of the first shaft section 36 in a state where the first shaft section 36 and the second shaft section 37 are engaged with the corresponding through-hole 28 in the passive link 13 from one end surface and the other end surface, respectively. As a result of fastening the male thread 42 of the second shaft section 37 to the female thread 41 of the first shaft section 36 within the through-hole 28, the flange sections 40 and 44 come into abutment with each other at the one end surface and the other end surface. As the male thread 42 and the female thread 41 are further fastened to each other from this state, each passive link 13 becomes clamped in the first direction between the flange section 40 of the first shaft section 36 and the flange section 44 of the second shaft section 37, as shown in FIG. 9, whereby a compression force can be applied to the passive link 13.

The shaft 30 fixed to the attachment section 27 of the additional actuator 22 includes a first shaft section (i.e., another first shaft section) 36 and a second shaft section (i.e., another second shaft section) 37 that have the same shape as the two shafts 26 fixed to the passive link 13. Specifically, the first shaft section 36 includes, in the following order from one axial end, a first engagement section 38, a flange section 40, and a second engagement section 39. The one axial end provided with the first engagement section 38 has a female thread 41 in the inner peripheral surface of a center hole centered on the central axis C.

The second shaft section 37 includes, in the following order from one axial end, a male thread 42, a first engagement section 43, a flange section 44, and a second engagement section 45. The female thread 41 of the first shaft section 36 and the male thread 42 of the second shaft section 37 constitute another fastening section 46.

The shaft 30 is fixed to the additional actuator 22 by fastening the male thread 42 of the second shaft section 37 to the female thread 41 of the first shaft section 36 in a state where the first shaft section 36 and the second shaft section 37 are engaged with the through-hole 29 in the attachment section 27 of the additional actuator 22 from one end surface and the other end surface, respectively. As a result of fastening the male thread 42 of the second shaft section 37 to the female thread 41 of the first shaft section 36 within the through-hole 29, the flange sections 40 and 44 come into abutment with each other at the one end surface and the other end surface. As the male thread 42 and the female thread 41 are further fastened to each other from this state, the attachment section 27 becomes clamped in the first direction between the flange section 40 of the first shaft section 36 and the flange section 44 of the second shaft section 37, whereby the shaft 30 can be securely fixed to the additional actuator 22.

The operation of the parallel link robot 1 according to this embodiment having the above-described configuration will be described below.

In the parallel link robot 1 according to this embodiment, the three drive links 10, 11, and 12 are rotated by driving the three actuators 7, 8, and 9 provided in the base section 2. When the drive links 10, 11, and 12 are rotated, passive displacement occurs between the drive links 10, 11, and 12 and the movable section 3 while the pairs of passive links 13, 14, and 15 coupled to the leading ends of the drive links 10, 11, and 12 by the spherical bearings 16 maintain a parallel relationship. Accordingly, the movable section 3 is translationally moved in three degrees of freedom in two horizontal directions and one vertical direction so as to be positioned to a desired position, while the central axis A of the wrist shaft member 18 is maintained in the vertical state.

Furthermore, by driving the additional actuator 22, the driving force of the additional actuator 22 is transmitted to the wrist shaft member 18 via the drive shaft 23, the first gear 20, and the second gear 21, whereby the wrist shaft member 18 is rotated around the central axis A relative to the casing 17. Accordingly, the orientation of a tool, such as a hand, attached to the attachment surface 18a at the lower end of the wrist shaft member 18 can be changed around the central axis A of the wrist shaft member 18.

When the movable section 3 is to be translationally moved at high speed relative to the base section 2 by operating the three arms 4, 5, and 6, the passive links 13, 14, and 15 and the additional actuator 22 receive large acceleration and deceleration. The support mechanism 25 used for attaching the additional actuator 22 to the passive links 13, 14, and 15 also receives large acceleration and deceleration.

In this case, the structure employed for rotatably attaching the auxiliary links 32 to the passive links 13 secures the shafts 26 and 30 in position by engaging them with the through-holes 28 and 29 provided in the passive links 13. Accordingly, the passive links 13 can be made narrower, as compared with a case where the shafts 26 and 30 are rotatably attached to the through-holes 28 and 29. Furthermore, because the female threads 41 of the first shaft sections 36 and the male threads 42 of the second shaft sections 37 are fastened to each other within the through-holes 28 and 29, the passive links 13 can be made narrower in the vicinity of the through-holes 28 and 29, as compared with a case of being fastened to each other at the radially outer side of the through-holes 28 and 29. Accordingly, an increase in inertia around the passive links 13 and the shafts 26 and 30 can be reduced.

Furthermore, as compared with a case where the shafts 26 and 30 are rotatably attached to the through-holes 28 and 29 in the passive links 13, the rolling bearings 31 can be located away from the shafts 26 and 30 in the axial direction, so that a load received by the rolling bearings 31 can be reduced relative to a moment applied to the passive links 13. Moreover, the passive links 13 and the shafts 26 and 30 being separate components facilitate the machining process of the passive links 13, thereby achieving cost reduction.

Furthermore, the shafts 26 and 30 are each constituted of the first shaft section 36, the second shaft section 37, and the fastening section 46. The shafts 26 and 30 are securely fixed to the passive links 13 by the fastening sections 46 in a state where the passive links 13 are clamped in the first direction between the first shaft sections 36 and the second shaft sections 37 engaged with the through-holes 28 and 29. Accordingly, the flange sections 40 and 44 of the shafts 26 and 30 and the passive links 13 are brought into close contact with each other with a strong compression force, so that friction can be increased therebetween. As a result, even if the passive links 13 and the like vibrate due to high-speed acceleration and deceleration occurring during translational movement of the movable section 3, relative movement between the passive links 13 and the shafts 26 and 30 is prevented, thereby preventing fretting from occurring more reliably.

Moreover, the passive links 13 are clamped in the first direction by the flange sections 40 and 44 provided in the first shaft sections 36 and the second shaft sections 37, and the shafts 26 and 30 are fixed by applying a compression force to the passive links 13. According to this structure, stress concentration on the first engagement sections 38 and 43 engaged with the through-holes 28 and 29 can be reduced. This is advantageous in that the shafts 26 and 30 can be maintained in a durably sound state.

By directly engaging the first shaft sections 36 and the second shaft sections 37 with the through-holes 28 and 29, areas where fretting may possibly occur can be minimized.

The fastening sections 46 that fasten the male threads 42 and the female threads 41 to each other facilitate the assembly process and are advantageous in terms of achieving stable fixation strength, as compared with a case where the shafts 26 and 30 are fixed within the through-holes 28 and 29 by using an adhesive, which is a simple fixation technique.

Specifically, the adhesive-based fixation technique is troublesome in that the adhesive has to be applied evenly, and the adhesion strength may vary depending on unevenness in the amount of adhesive applied, cleanliness of the adhesive surface, and temperature differences during the drying process. In contrast, the fixation technique using the fastening sections 46 is advantageous in that the fixation strength can be made stable by managing the fastening torque. Moreover, the fixation technique using the fastening sections 46 can achieve stable fixation strength without experiencing reduced fixation force caused by delamination of the adhesive as seen in the adhesive-based fixation technique.

Furthermore, in this embodiment, the structure employed for rotatably attaching the additional actuator 22 to the auxiliary links 32 is the same as the structure employed for rotatably attaching the auxiliary links 32 to the passive links 13. Accordingly, the attachment section 27 of the additional actuator 22 can be reduced in size around the shaft 30, and the occurrences of fretting and stress concentration can be suppressed, so that the shaft 30 can be maintained in a durably sound state.

The structure for rotatably attaching the additional actuator 22 to the auxiliary links 32 being the same as the structure for rotatably attaching the auxiliary links 32 to the passive links 13 is advantageous in that cost reduction can be achieved as a result of a reduced number of types of components.

As an alternative to this embodiment in which the structure for rotatably attaching the additional actuator 22 to the auxiliary links 32 is the same as the structure for rotatably attaching the auxiliary links 32 to the passive links 13, the two structures may be different from each other. Specifically, because the attachment section 27 of the additional actuator 22 is less dimensionally limited than the passive links 13, the shaft 30 may be rotatably attached to the attachment section 27 by using the bearings 31.

Furthermore, as an alternative to this embodiment in which each fastening section 46 has the female thread 41 provided in the first shaft section 36 and the male thread 42 provided in the second shaft section 37, the male thread 42 may be provided in the first shaft section 36 and the female thread 41 may be provided in the second shaft section 37.

Figure 10:
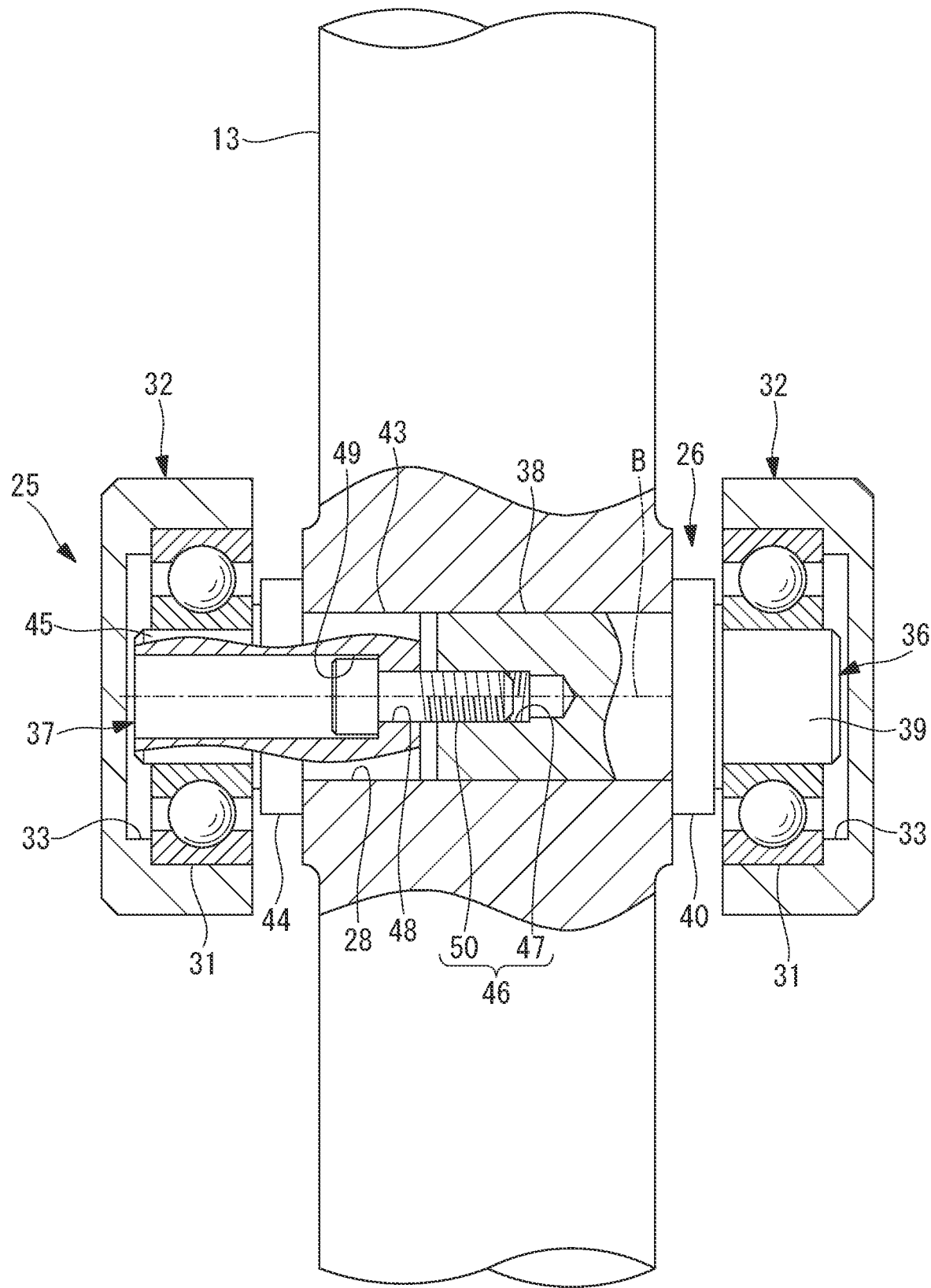
FIG. 10 is a partial vertical sectional view illustrating a modification of the shaft of the support mechanism in FIG. 7.

Furthermore, each fastening section 46 that fastens the first shaft section 36 and the second shaft section 37 to each other is constituted of the female thread 41 provided in the first shaft section 36 and the male thread 42 provided in the second shaft section 37. Alternatively, as shown in FIG. 10, a screw hole (i.e., a female thread) 47 may be provided in the first shaft section 36 along the central axis B, a pilot hole (screw through-hole) 48 and a countersunk hole 49 may be provided in the second shaft section 37 along the central axis B, and a bolt 50 passing through the pilot hole 48 and the screw hole 47 of the first shaft section 36 may constitute the fastening section 46. As another alternative, the screw hole 47 may be provided in the second shaft section 37, and the pilot hole 48 and the countersunk hole 49 may be provided in the first shaft section 36.

As an alternative to this embodiment in which the auxiliary links 32 are disposed at the opposite sides of the two passive links 13, only one auxiliary link 32 may be disposed at one side.

As an alternative to this embodiment in which the support mechanism 25 is provided at the arm 4 having the additional actuator 22 disposed between the passive links 13, the arms 5 and 6 not having additional actuators 22 may be provided with support mechanisms 25.

In this case, the support mechanisms 25 of the arms 5 and 6 each include two parallel shafts 26 fixed to the passive links 14 or 15, four rolling bearings (i.e., bearings) 31 in which the opposite ends of the two shafts 26 engage with inner rings thereof, and a pair of auxiliary links 32 to which outer rings of two of the rolling bearings 31 are fixed. Accordingly, rotation of the passive links 14 and 15 around the longitudinal axis can be suppressed at the arms 5 and 6 not having additional actuators 22.

In the parallel link robot 1, at least one of the three arms 4, 5, and 6 may be provided with the support mechanism 25.

REFERENCE SIGNS LIST

1 parallel link robot
7, 8, 9 actuator
10, 11, 12 drive link
13, 14, 15 passive link
22 additional actuator
25 support mechanism
26 shaft
28 through-hole
31 rolling bearing (bearing, another bearing)
32 auxiliary link
36 first shaft section (another first shaft)
37 second shaft section (another second shaft)
41 female thread
42 male thread
46 fastening section (another fastening section)
48 pilot hole (screw through-hole)
50 bolt
C central axis (axis)

The invention claimed is:

1. A parallel link robot comprising:
   a drive link rotationally driven by an actuator;
   two parallel rod-shaped passive links coupled to a leading end of the drive link; and
   a support mechanism having two shafts and an auxiliary link, each of the shafts being fixed to each of the passive links in a state where each of the shafts is engaged with a through-hole provided at an intermediate position of each of the passive links in a direction of a longitudinal axis thereof, the auxiliary link being rotatably attached to the shafts by two bearings in which the shafts engage with inner rings thereof,
   wherein the through-hole is formed in a first direction that is orthogonal to a plane including the longitudinal axis of each of the two passive links, and
   wherein each of the shafts includes a first shaft section, a second shaft section, and a fastening section, the first shaft section being engaged with the through-hole from one end surface in the first direction and abutting on the one end surface, the second shaft section being engaged with the through-hole from the other end surface in the first direction and abutting on the other end surface, the fastening section applying a force in a direction that causes the first shaft section and the second shaft section to approach each other within the through-hole.

2. The parallel link robot according to claim 1, further comprising:
   an additional actuator disposed between the passive links and supported by the passive links by using the support mechanism,
   wherein the additional actuator is supported by the auxiliary link in such a manner as to be rotatable around an axis that is parallel to the first direction.

3. The parallel link robot according to claim 2,
   wherein the auxiliary link and the two bearings are disposed at opposite sides of the passive links in the first direction, and
   wherein the additional actuator is supported by two auxiliary links.

4. The parallel link robot according to claim 2,
   wherein the fastening section includes a female thread provided in one of the first shaft section and the second shaft section and a male thread that is provided in the other one of the first shaft section and the second shaft section and that is fastened to the female thread.

5. The parallel link robot according to claim 2,
   wherein the fastening section includes a female thread provided in one of the first shaft section and the second shaft section, a screw through-hole provided in the other one of the first shaft section and the second shaft section, and a bolt that passes through the screw through-hole and that is fastened to the female thread.

6. The parallel link robot according to claim 2,
   wherein a mechanism that causes the additional actuator to be supported by the auxiliary link in such a manner as to be rotatable around the axis includes another shaft and another bearing, the another shaft being fixed to the additional actuator in a state where the another shaft is engaged with another through-hole provided in a direction extending along the axis in the additional actuator, the another bearing being provided in the auxiliary link and in which the another shaft engages with an inner ring thereof, and wherein the another shaft includes another first shaft section, another second shaft section, and another fastening section, the another first shaft section being engaged with the another through-hole from one end surface in a direction of the axis and abutting on the one end surface, the another second shaft section being engaged with the another through-hole from the other end surface in the direction of the axis and abutting on the other end surface, the another fastening section applying a force in a direction that causes the another first shaft section and the another second shaft section to approach each other within the another through-hole.

\* \* \* \* \*